United States Patent
Zou et al.

(10) Patent No.: US 12,177,021 B2
(45) Date of Patent: *Dec. 24, 2024

(54) CONTROL METHOD AND DEVICE FOR A DATA PACKET DUPLICATION FUNCTION, COMMUNICATION DEVICE, AND STORAGE MEDIUM

(71) Applicant: ZTE CORPORATION, Guangdong (CN)

(72) Inventors: Wei Zou, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,636

(22) Filed: Aug. 14, 2023

(65) Prior Publication Data

US 2023/0403103 A1 Dec. 14, 2023

Related U.S. Application Data

(63) Continuation of application No. 17/305,659, filed on Jul. 12, 2021, now Pat. No. 11,728,935, which is a
(Continued)

(30) Foreign Application Priority Data

May 5, 2017 (CN) .......................... 201710313136.1

(51) Int. Cl.
*H04L 1/18* (2023.01)
*H04L 69/322* (2022.01)
(Continued)

(52) U.S. Cl.
CPC .............. *H04L 1/18* (2013.01); *H04L 69/322* (2013.01); *H04W 28/12* (2013.01); *H04W 76/27* (2018.02); *H04L 2101/622* (2022.05)

(58) Field of Classification Search
CPC ................... H04L 1/18; H04L 69/322; H04L 2101/622; H04L 29/06095; H04L 61/6022;
(Continued)

(56) References Cited

U.S. PATENT DOCUMENTS

2007/0293173 A1 12/2007 Jiang
2008/0165795 A1* 7/2008 Baruch ............... H04L 49/9094
370/421
(Continued)

FOREIGN PATENT DOCUMENTS

CN 1751459 A 3/2006
CN 103888222 A 6/2014
(Continued)

OTHER PUBLICATIONS

"Activating and deactivating packet duplication", Sokane, USA, Apr. 3-7, 2017 (Year: 2017).*
China National Intellectual Property Administration, First Office Action dated Jul. 22, 2020 for Chinese Patent Application No. 2017103131361, 19 pages.
Ericsson, "Duplication in UL in Dual Connectivity," 3GPP TSG-RAN WG2 #97bis, R2-1702750, Spokane, Washington, USA, 2 pages, Apr. 2017.
(Continued)

*Primary Examiner* — Mewale A Ambaye
(74) *Attorney, Agent, or Firm* — Perkins Coie LLP

(57) ABSTRACT

Provided are a control method and device for a data packet duplication function, and a communication device. The control method for the data packet duplication function includes determining, by a communication device, to deactivate or activate a data packet duplication function; and performing, by the communication device, an operation of deactivating or activating the data packet duplication function correspondingly. Further provided is a storage medium.

16 Claims, 5 Drawing Sheets

Related U.S. Application Data continuation of application No. 16/673,934, filed on Nov. 4, 2019, now Pat. No. 11,063,704, which is a continuation of application No. PCT/CN2018/085827, filed on May 7, 2018.

(51) Int. Cl.
*H04W 28/12* (2009.01)
*H04W 76/27* (2018.01)
*H04L 101/622* (2022.01)

(58) Field of Classification Search
CPC ........ H04L 47/26; H04L 47/33; H04W 76/27; H04W 28/12; H04W 76/00; H04W 28/10
See application file for complete search history.

(56) References Cited

U.S. PATENT DOCUMENTS

| | | | |
|---|---|---|---|
| 2012/0057560 | A1 | 3/2012 | Park et al. |
| 2015/0043492 | A1 | 2/2015 | Baek et al. |
| 2017/0142770 | A1 | 5/2017 | Fu et al. |
| 2018/0324642 | A1* | 11/2018 | Yu ................... H04L 5/0053 |
| 2019/0082363 | A1 | 3/2019 | Park et al. |
| 2019/0253926 | A1 | 8/2019 | Kim et al. |
| 2020/0044723 | A1* | 2/2020 | Cirik ................ H04B 7/0695 |
| 2020/0053613 | A1* | 2/2020 | Cirik ................ H04L 5/0064 |
| 2020/0350972 | A1 | 11/2020 | Yi et al. |
| 2020/0351730 | A1 | 11/2020 | Park et al. |
| 2020/0351931 | A1 | 11/2020 | Babaei et al. |

FOREIGN PATENT DOCUMENTS

| | | | | |
|---|---|---|---|---|
| CN | 104349385 | B3 | 2/2015 | |
| CN | 107147479 | B4 | 9/2017 | |
| CN | 107342851 | B5 | 11/2017 | |
| EP | 3379863 | A1 * | 9/2018 | ........ H04W 28/0252 |
| WO | 2004088879 | B6 | 10/2004 | |
| WO | 2018059557 | B7 | 4/2018 | |

OTHER PUBLICATIONS

Ericsson, "Data duplication in lower layers (HARQ)", 3GPP TSG-RAN WG2 #97, Athens, Greece, R2-1702032 (Revision of R1-1700833), 6 pages, Feb. 13-17, 2017.

Ericsson, "Split SRB: Remaining Issues," 3GPP TSG-RAN WG2 #97bis, Spokane, USA, Apr. 3-7, 2017, R2-1702707, 4 pages.

Huawei et al. "Activating and Deactivating Packet Duplication," 3GPP TSG-RAN2 #97bis, R2-1703529, Spokane, Washington, USA, 4 pages, Apr. 2017.

Interdigital Communications, "Packet Duplication at PDCP", 3GPP TSG-RAN WG2 Meeting #97, Athens, Greece, R2-1701186, 2 pages, Feb. 13-17, 2017.

International Search Report and Written Opinion mailed on Jul. 16, 2018 for International Application No. PCT/CN2018/085827, filed on May 7, 2018 (12 pages).

Mediatek Inc., "PDCP configuration for packet duplication", 3GPP TSG-RAN WG2 Meeting 97bis, Spokane, USA, R2-1703527, 4 pages, Apr. 3-7, 2017.

Nokia et al., "Overview of Duplication Operation", 3GPP TSG-RAN WG2 Meeting #97bis, Spokane, USA, R2-1702632, 2 pages, Apr. 3-7, 2017.

Nokia et al., "Duplication Impacts to PDCP," 3GPP TSG-RAN WG2 Meeting #98, Hangzhou, China, May 15-19, J017, R2-1704276, R2-1702642, 5 pages.

Nokia et al. "Duplication Impacts to MAC," 3GPP TSG-RAN WG2 Meeting #97bis, R2-1702639, Spokane, Washington, USA, 3 pages, Apr. 2017.

NPL Document, "Activating and deactivating packet duplication", Spokane, USA, Apr. 3-7, 2017 (Year: 2017).

Supplementary European Search Report issued in EP Patent Application No. 18794843, dated Nov. 17, 2020, 3 pages.

U.S. Appl. No. 62/475,981, filed Mar. 24, 2017 (9 pages).

U.S. Appl. No. 62/475,600, filed Mar. 23, 2017 (54 pages).

U.S. Appl. No. 62/417,455, filed Nov. 4, 2016 (83 pages).

ZTE, "Consideration on the Activation/Deactivation of Data Duplication for CA," 3GPP TSG-RAN WG2 Meeting #98, R2-1704660, Hangzhou, China, 3 pages, May 2017.

CNIPA, First Office Action for Chinese Application No. 202011527240.9, mailed on Aug. 5, 2024, 15 pages with unofficial English translation.

* cited by examiner

CONTROL METHOD AND DEVICE FOR A DATA PACKET DUPLICATION FUNCTION, COMMUNICATION DEVICE, AND STORAGE MEDIUM

CROSS-REFERENCES TO RELATED APPLICATIONS

This patent document is a continuation of U.S. patent application Ser. No. 17/305,659, filed on Jul. 12, 2021, which is a continuation of U.S. patent application Ser. No. 16/673,934, filed on Nov. 4, 2019, which is a continuation of and claims the benefit of priority to International Patent Application No. PCT/CN2018/085827, filed on May 7, 2018, which claims the benefit of priority of Chinese Patent Application No. 201710313136.1, filed on May 5, 2017. The entire contents of the before-mentioned patent applications are incorporated by reference as part of the disclosure of this application.

TECHNICAL FIELD

The present disclosure relates to the field of wireless communications and, in particular, to a control method and device for a data packet duplication function, a communication device, and a storage medium.

BACKGROUND

The 5th generation (5G) technology being studied by the 3GPP will implement greater throughput, more user connections, a lower latency, higher reliability, lower power consumption (including network equipment and user equipment) and the like. At present, the industry proposes the following goal for the 5G technology: by 2020, mobile data traffic per region will be increased by 1000 times, throughput per user equipment (UE) will be increased by 10 to 100 times, the number of connected devices will be increased by 10 to 100 times, a battery service life will be increased by 10 times for a low-power device, and an end-to-end latency will be decreased by 5 times. From a perspective of an application scenario, a unified technical architecture is adopted in 5G to support enhanced mobile broadband (eMBB), massive machine type communication (mMTC), ultra reliable and low latency communication (URLL), which have different requirements on reliability. For traffic requiring for a high reliability, data may be sent in a data packet duplication manner. The purpose of data packet duplication is to transmit the same data packet on different wireless links (which may be different carriers or different wireless transceiver nodes), thereby improving the reliability of the data packet arriving at a receiving end.

However, in some cases, the data packet duplication function will cause data redundancy, resulting in waste of communication resources and computing resources. In other cases, the data packet duplication function may not be successfully performed, causing that the reliability of the data transmission using data packet duplication cannot be guaranteed.

SUMMARY

The present application provides a control method and device for data packet duplication function, a communication device and a storage medium.

Embodiments of the present application provide the following technical solutions.

A control method for a data packet duplication function includes: determining, by a communication device, to deactivate or activate a data packet duplication function; and performing, by the communication device, an operation of deactivating or activating the data packet duplication function correspondingly.

A control device for a data packet duplication function includes: a decision module, which is configured to decide to deactivate or activate a data packet duplication function; and an execution module, which is configured to perform an operation of deactivating or activating the data packet duplication function correspondingly.

In one embodiment, the control device further includes: a notification module, which is configured to notified a peer device of a radio bearer to deactivate or activate the data packet duplication function correspondingly after the decision module decides to deactivate or activate the data packet duplication function.

A communication device includes a processor and memory.

The memory is configured to store executable instructions.

The processor is configured to execute the executable instructions to perform the following operations: determining to deactivate or activate a data packet duplication function; and performing an operation of deactivating or activating the data packet duplication function correspondingly.

Through the solutions in the embodiments of the present disclosure, the data packet duplication function may be effectively deactivated or activated. When the data packet duplication function is activated, different links can be used to improve the reliability of data packet reception. When the reliability cannot be improved, the data packet duplication function is deactivated to save radio resources. For example, compared with the scheme in which the data packet duplication function is always activated, the data packet duplication function activation/deactivation scheme can automatically and/or flexibly activate or deactivate the data packet duplication function when a specific event or instruction satisfy a specific condition. In this way, when the data packet duplication function is required to ensure transmission reliability, the data packet duplication function is maintained at an activated state, and when the data packet duplication function is not required to ensure the transmission reliability through duplicating the data packet, the data packet duplication function is maintained at a deactivated state, unnecessary data packet duplication operation and transmission of duplicated data packet are reduced, thereby reducing computing resources consumed by the data packet duplication and waste of communication resources required to transmit the duplicated data packet.

DETAILED DESCRIPTION

The object, technical solution and advantages of the present application will be clearer from a detailed description of embodiments of the present application in conjunction with the drawings. It is to be noted that if not in collision, the embodiments and features therein in the present application may be combined with each other.

The steps shown in the flowchart among the drawings may be performed by a computer system such as a group of computers capable of executing instructions. Although logical sequences are shown in the flowchart, the shown or described steps may be performed in sequences different from those described herein in some cases.

Figure 1:
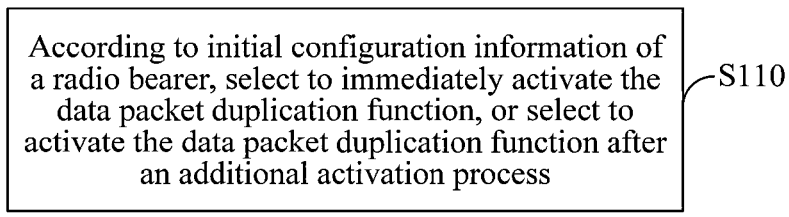
FIG. 1 is a flowchart of a control method for a data packet duplication function provided by an embodiment.

A control method for a data packet duplication function, as shown in FIG. 1, includes a step S110.

In step S110, the communication device selects to immediately activate the data packet duplication function according to initial configuration information of a radio bearer, or selects to activate the data packet duplication function after an additional activation process.

In this embodiment, the data packet duplication function is defined in initial configuration of the radio bearer.

After the initial configuration of the radio bearer is completed, the data packet duplication function is activated immediately, i.e., no additional activation process is required. In this case, by default, the data packet duplication function is activated (i.e., in an activated state).

After the initial configuration of the radio bearer is completed, the data packet duplication function may be activated after an additional activation process is performed. In this case, by default, the data packet duplication function is deactivated (i.e., in an deactivated state).

The additional activation process may include any one or more of: an event triggering the activation of the data packet duplication function occurs, and signaling message for activating the data packet duplication function is received.

In one embodiment, the predetermined condition (such as whether the additional activation process is needed) may be specified by the initial configuration of the radio bearer.

In one embodiment, after the data packet duplication function is activated, the method further includes: pausing or restoring the data packet duplication function of the radio bearer through an additional deactivation or activation process.

Figure 2:
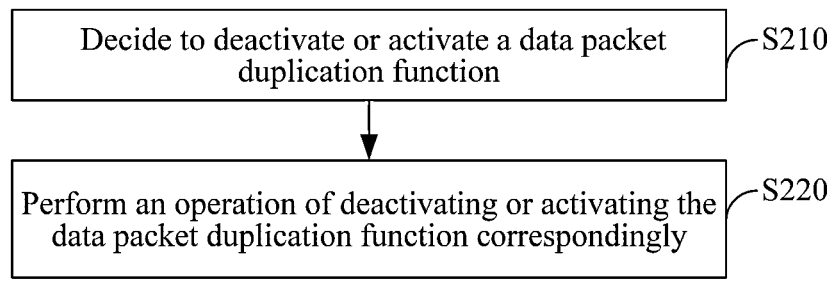
FIG. 2 is a flowchart of a control method for a data packet duplication function provided by an embodiment.

A control method for a data packet duplication function, as shown in FIG. 2, includes steps S210 and S220.

In step S210, a communication device decides to deactivate or activate a data packet duplication function.

In step S220, the communication device performs an operation of deactivating or activating the data packet duplication function correspondingly.

In this embodiment, the steps S210 and S220 may be performed by a packet data convergence protocol (PDCP) entity of the communication device.

In one embodiment, after the step in which the communication device decides to deactivate or activate the data packet duplication function, the method further includes: the communication device notifies a peer device of a radio bearer to deactivate or activate the data packet duplication function.

In one embodiment, the communication device is a network equipment, and the peer device of the radio bearer is a user equipment. Alternatively, the communication device is the user equipment and the peer device of the radio bearer is the network equipment. In short, in the embodiment of the present application, devices on two sides of the communication may be interchanged.

In one embodiment, the step in which the communication device decides to activate the data packet duplication function may include: the communication device selects, according to initial configuration information of the radio bearer, to immediately activate the data packet duplication function or to activate the data packet duplication function after an additional activation process.

Other implementation details of this optional solution can be seen in the optional solutions of the above embodiments.

In one embodiment, the step in which the communication device decides to deactivate or activate the data packet duplication function may include: the communication device autonomously decides whether to start a process of deactivating or activating the data packet duplication function according to a local data packet sending status.

In one embodiment, the step in which the communication device decides to deactivate or activate the data packet duplication function may include that the communication device may preconfigure one or more events. When the preconfigured event occurs, the communication device decides to start the process of deactivating or activating the data packet duplication function according to the event that occurs.

The event is, for example, but not limited to, activating the data packet duplication function when a signal-to-noise ratio is greater than or equal to a first predetermined threshold, and deactivating the data packet duplication function when the signal-to-noise ratio is less than or equal to a second predetermined threshold.

In one embodiment, the first predetermined threshold is less than the second predetermined threshold. In this way, the data packet duplication function (equivalent to enable or start the data packet duplication function) may be activated when the signal-to-noise ratio is low. Transmission of the duplicated data packet generated by the data packet duplication function ensures the reliability of the data transmission. When the signal-to-noise ratio is high, the data packet duplication function is deactivated (equivalent to disable or close the data packet duplication function), the data packet duplication of the data packet duplication function is disabled, computing resources consumed by the data packet duplication and waste of communication resources required for transmitting the duplicated data packet are reduced, and computing resources and communication resources are saved.

In one embodiment, the data packet duplication function is activated or deactivated according to the traffic type of the data packet currently transmitted by the communication device. If the traffic type is a predetermined type, the data packet duplication function is activated; otherwise, the data packet duplication function is deactivated. For example, the traffic type may be URLLC.

In one embodiment, the data packet duplication function is activated or deactivated according to an operation mode of the communication device. If the current communication device operates in a carrier aggregation (CA) mode and/or a dual connectivity (DC) mode, the data packet duplication function is activated; otherwise, the data packet duplication function is deactivated.

In one embodiment, the data packet duplication function is activated or deactivated according to a communication requirement parameter. For example, if the quality of service (QoS) is higher than a predetermined value, the data packet duplication function is activated; otherwise, the data packet duplication function is deactivated.

In some embodiments, after the data packet duplication function is activated, the data packet is duplicated according to a predetermined duplication rule. For example, the predetermined duplication rule may include but is not limited to at least one of:

duplication rule one: duplicating original data packets one by one;

duplication rule two: duplicating one original data packet every predetermined number of original data packets, such as duplicating one original data packet every S original data packets, and S may be a positive integer;

duplication rule three: duplicating the original data packet according to a data packet type. For example, only the initially transmitted data packet is duplicated and the retransmitted data packet is not duplicated. For another example, only the signaling data packet carrying signaling is duplicated and the data packet carrying traffic data is not duplicated. For another example, only the important data packet, which is specified, is duplicated, and the non-important data packet is not duplicated. If the important data packet has been received by the receiving end and the non-important data packet is lost, the non-important data packet may be reconstructed based on the important data packet. The important data packet may be: a data packet among image data packets in which an important frame is located, and the non-important data packet may be a data packet among the image data packets in which a non-important frame is located.

In one embodiment, the step in which the communication device decides to deactivate or activate the data packet duplication function may include: receiving, by the communication device, a signaling message for activating or deactivating the data packet duplication function.

The signaling message for activating or deactivating the data packet duplication function may be sent by the peer device of the radio frame. Alternatively, the signaling message may be sent by a transceiving node in the communication device. For example, the communication device includes two transceiving nodes, a radio link control (RLC) entity in one transceiving node decides to deactivate or activate the data packet duplication function, and notifies a PDCP entity in the other transceiving node through the signaling message for activating or deactivating the data packet duplication function.

In one embodiment, when the communication device includes two transceiving nodes, the communication device may configure a corresponding event between the two transceiving nodes.

In one embodiment, after an event occurs, information related to the event that occurs is transmitted between two sending transceiving nodes.

In one embodiment, the step in which the communication device decides to deactivate or activate the data packet duplication function may include: determining, by the communication device, to deactivate or activate the data packet duplication function according to the transmitted information related to the event, and selecting at least one link to perform the operation of deactivating or activating the data packet duplication function correspondingly.

In one embodiment, after the event occurs, a desired signaling message for deactivating or activating the data packet duplication function may be transmitted between two transceiving nodes of the communication device.

Configuring the corresponding event, transmitting information related to the event and delivering a signaling message between the two transceiving nodes may be, but is not limited to, performed by an Xn interface.

In one embodiment, the signaling message for deactivating or activating the data packet duplication function may include an identification of a suggested link for deactivating or activating the data packet duplication function.

In this optional embodiment, the step in which the communication device performs the operation of deactivating or activating the data packet duplication function correspondingly may include that: for the link suggested in the signaling message for deactivating or activating the data packet duplication function, the communication device starts to disable or enable the data packet duplication function. In the case of disabling the data packet duplication function, the communication device stops sending the duplicated data packet to the RLC entity of the suggested link. Alternatively, in the case of enabling the data packet duplication function, the communication device starts to send the duplicated data packet to the RLC entity of the suggested link.

In other optional embodiment, the communication device may autonomously determine or select the link to perform the operation of deactivating or activating the data packet duplication function.

In one embodiment, the identification of the link may be a logic channel identification of the link.

In one embodiment, the communication device may define a primary link and a secondary link of the radio bearer in advance, and each link is an end-to-end connection including a RLC entity.

In one embodiment, the step in which the communication device performs the operation of deactivating or activating the data packet duplication function correspondingly may include the following step.

For the secondary link, the communication device starts to disable or enable the data packet duplication function. In a case of starting to disable the data packet duplication function, the communication device stops sending the duplicated data packet to the RLC entity of the secondary link. Alternatively, in a case of starting to enable the data packet duplication function, the communication device starts to send the duplicated data packet to the RLC entity of the secondary link.

In an example of this optional solution, after receiving the signaling message for deactivating or activating the data packet duplication function from the peer device of the radio bearer, the communication device correspondingly starts to disable or enable the data packet duplication function. In the case of disabling the data packet duplication function, the peer device stops sending the duplicated data packet to the RLC entity of the secondary link. Alternatively, in the case of starting to enable the data packet duplication function, the peer device starts sending the duplicated data packet to the RLC entity of the secondary link.

In one embodiment, the step in which the communication device decides to deactivate or activate the data packet duplication function may include: selecting, by the communication device, at least one link to perform the operation of deactivating or activating the data packet duplication function according to a source transceiving node (i.e., a transceiving node sending the signaling message for deactivating or activating the data packet duplication function).

In one embodiment, notifying, by the communication device, the peer device of the radio bearer to deactivate or activate the data packet duplication function includes: sending, by the communication device, a signaling message for deactivating or activating the data packet duplication function to the peer device of the radio bearer correspondingly.

The signaling message for activating or deactivating the data packet duplication function may be used for indicating the peer device of the radio bearer to correspondingly to disable or enable the data packet duplication function.

In one embodiment, the signaling message for activating or deactivating the data packet duplication function includes any one or more of:

In one embodiment, the signaling message for activating or deactivating the data packet duplication function may include at least one or more of: a signaling message of a radio resource control (RRC) layer, a protocol data unit (PDU) for delivering a control message of a PDCP layer, a control element of a medium access control (MAC) layer, or a sub-header of the MAC layer.

The signaling message for deactivating or activating the data packet duplication function is used for triggering the peer device of the radio bearer to perform the operation of deactivating or activating the data packet duplication function on a predefined secondary link correspondingly.

In one embodiment, the data packet duplication function is located in the PDCP layer of the peer device of the radio bearer, i.e. a PDU of a PDCP is duplicated.

In one embodiment, the signaling message for deactivating or activating the data packet duplication function includes an identification of a link whose data packet duplication function needs to be deactivated or activated.

In one embodiment, the identification of the link may be a logic channel identification of the link.

In one embodiment, the step in which the communication device sends the signaling message for deactivating or activating the data packet duplication function to the peer device of the radio bearer correspondingly includes: the communication device selects a link to send the signaling message for deactivating or activating the data packet duplication function, and notifies, through a logic channel used by actual transmission of the signaling message for deactivating or activating the data packet duplication function, the peer device of the radio bearer of the link whose data packet duplication function is expected to be deactivated or activated.

In one embodiment, when the radio bearer includes two links, the communication device sends the signaling message for deactivating or activating the data packet duplication function in one link, it indicates that the data packet duplication function of the other link is expected to be deactivated or activated.

In one embodiment, the step in which the communication device performs the operation of deactivating the data packet duplication function may include any one or more of: disabling, by the communication device, the data packet duplication function, and stopping sending a duplicated data packet to an RLC entity in a deactivated link; clearing, by the communication device, a buffer of the RLC entity in the deactivated link; and resetting, by the communication device, a parameter of the RLC entity in the deactivated link.

In one embodiment, the step in which the communication device performs the operation of activating the data packet duplication function may include any one or more of: enabling, by the communication device, the data packet duplication function, starting to send a duplicated data packet to an RLC entity in an activated link; enabling or restoring, by the communication device, a processing function of the RLC entity in the activated link; and enabling, by the communication device, a radio resource scheduling corresponding to the activated link in the MAC layer.

In one embodiment, after the communication device performs the operation of deactivating or activating the data packet duplication function correspondingly, the method may further include: sending, by the communication device, a buffer state report to the peer device of the radio bearer.

Figure 3:
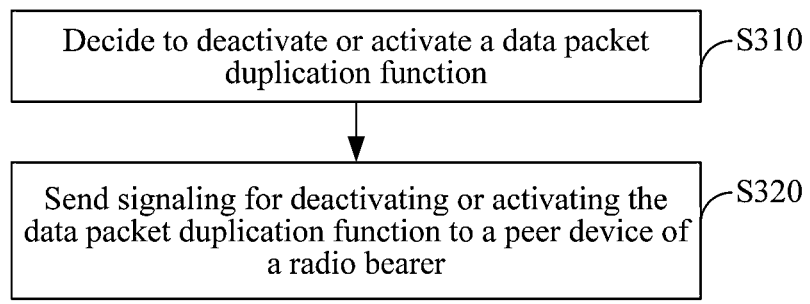
FIG. 3 is a flowchart of a control method for a data packet duplication function provided by an embodiment.

A control method for a data packet duplication function, as shown in FIG. 3, includes steps S310 and S320.

In step S310, a communication device decides to deactivate or activate a data packet duplication function.

In step S320, the communication device sends signaling message for deactivating or activating the data packet duplication function to a peer device of a radio bearer correspondingly.

In this embodiment, the communication device may notify the peer device of the radio bearer of the deactivating or activating process by means of a deactivating or activating signaling message.

In this embodiment, the signaling message for deactivating or activating the data packet duplication function may be sent to a PDCP entity of the peer device of the radio bearer correspondingly.

In one embodiment, the communication device is a network equipment, and the peer device of the radio bearer is a user equipment; or the communication device is the user equipment, and the peer device of the radio bearer is the network equipment.

In one embodiment, the signaling message for activating or deactivating the data packet duplication function may include any one or more of: a signaling message of a radio resource control (RRC) layer, a protocol data unit (PDU) for delivering a control message of a PDCP layer, a control element of a medium access control (MAC) layer, or a sub-header of the MAC layer.

In one embodiment, the signaling message activating or deactivating the data packet duplication function is used for indicating the peer device of the radio bearer to correspondingly start disabling or enabling the data packet duplication function.

In one embodiment, the data packet duplication function may be located in the PDCP layer of the peer device of the radio bearer, i.e. a PDU of a PDCP is duplicated.

In one embodiment, the peer device of the radio bearer may define a primary link and a secondary link of the radio bearer in advance, and each link is an end-to-end connection including a RLC entity.

In this optional solution, the signaling message for deactivating or activating the data packet duplication function may be used for triggering the peer device of the radio bearer to perform the operation of deactivating or activating the data packet duplication function on the secondary link correspondingly.

In this optional solution, after receiving the signaling message for deactivating or activating the data packet duplication function, the peer device of the radio bearer starts to disable or enable the data packet duplication function of the secondary link. In the case of starting to disable the data packet duplication function, the peer device stops sending the duplicated data packet to the RLC entity of the secondary link; or in the case of starting to enable the data packet duplication function, the peer device starts to send the duplicated data packet to the RLC entity of the specified link.

In one embodiment, the signaling message for deactivating or activating the data packet duplication function may include an identification of a link whose data packet duplication function needs to be deactivated or activated.

In one embodiment, the identification of the link may be a logic channel identification of the link.

In one embodiment, the step in which the communication device sends the signaling message for deactivating or activating the data packet duplication function to the peer device of the radio bearer may include that the communication device selects a link to send the signaling message for deactivating or activating the data packet duplication function, and notifies, through a logic channel used by actual transmission of the signaling message for deactivating or activating the data packet duplication function, the peer device of the radio bearer of the link whose data packet duplication function is expected to be deactivated or activated.

In one embodiment, when the radio bearer includes two links, if the communication device sends the signaling message for deactivating or activating the data packet duplication function in one link, it indicates that the data packet duplication function of the other link is expected to be deactivated or activated.

Other implementation details may be seen in the above embodiments.

The network equipment is taken as the communication device, and the user equipment is taken as the peer device of the radio bearer, however the actual application is not limited to this. The user equipment may be taken as the communication device, and the network equipment is taken as the peer device of the radio bearer. The network equipment may be an device located in an access network and/or a core network, such as one or more of a base station, a mobility management entity and an access management function.

Figure 4A:
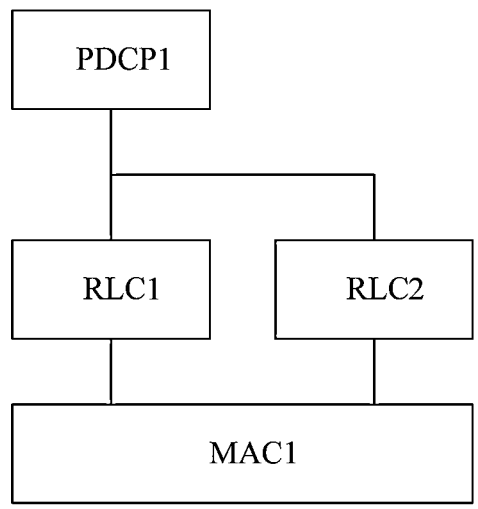
FIG. 4a is a schematic diagram of implementing a data packet duplication transmission in a carrier aggregation mode provided by an embodiment.
Figure 4B:
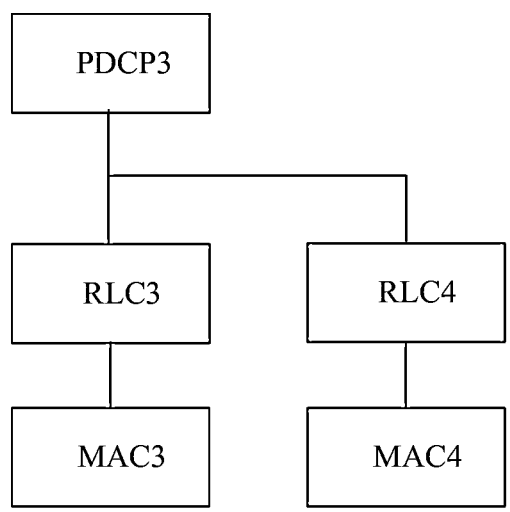
FIG. 4b is a schematic diagram of implementing a data packet duplication transmission in a dual connectivity mode provided by an embodiment.

FIGS. 4a and 4b are schematic diagrams illustrating two implementations of a data packet duplication transmission function. The data duplication manner includes two modes.

One mode is a carrier aggregation (CA) mode. One radio bearer includes one PDCP entity, two RLC entities and one MAC entity, as shown in FIG. 4a, the PDCP1 is connected to the RLC 1 and RLC 2 separately, and the RLC 1 and RLC 2 are both connected to the MAC1.

In this mode, the PDCP1, the RLC1, the RLC2 and the MAC1 may be taken as a transceiving node, and each of the RLC1 and the RLC2 is taken as a wireless link channel.

The other mode is a dual connectivity (DC) mode. One radio bearer includes one PDCP entity, two RLC entities and two MAC entities, as shown in FIG. 4b. The PDCP3 is connected to the RLC3 and the RLC4 separately, the RLC3 is connected to the MAC3, and the RLC4 is connected to the MAC4.

In this mode, the PDCP3, the RLC3, the MAC3 may be taken as a transceiving node, the RLC4 and the MAC4 may be taken as another transceiving node, and each of the RLC3 and the RLC4 is taken as a wireless link channel.

In the two modes, the PDCP entity duplicates the data packet and forwards two identical data packets to the two RLC entities separately. In the CA mode, the two RLC entities are scheduled by one MAC entity, while in the DC mode, the two RLC entities are separately scheduled by different MAC entities.

It is assumed that in a state in which the data packet duplication function is activated, when the two wireless link channels have huge difference in quality, reliability enhancement provided by the wireless link with a poorer quality may be negligible. In this case, unnecessary wireless overhead may be saved by deactivating the data packet duplication function. When the quality of the wireless link channel with the poorer quality has been improved, the data packet duplication function may be reactivated.

Figure 5:
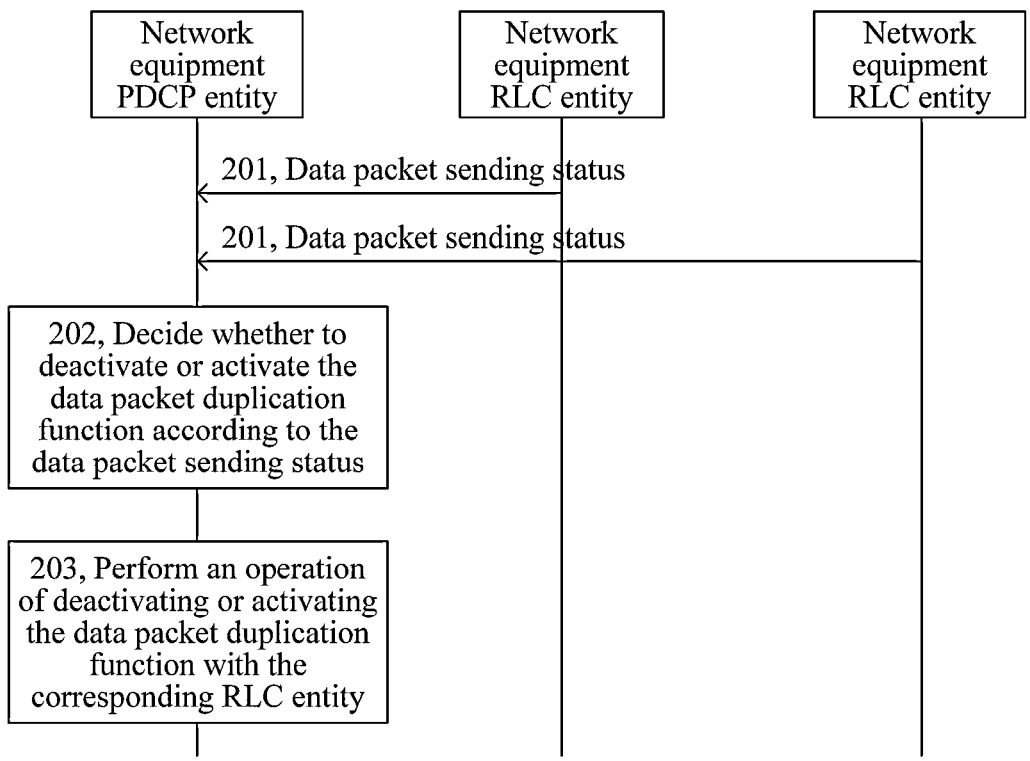
FIG. 5 is a flowchart illustrating that a network equipment decides to deactivate or activate a data packet duplication function according to a data packet sending status of each RLC entity of each link provided by an embodiment.

FIG. 5 is a flowchart illustrating that a network equipment decides to deactivate or activate a data packet duplication function according to a data packet sending status of the RLC of each link provided by an embodiment. As shown in FIG. 5, the implementation process includes steps 201 to 203 described below.

In step 201, a RLC entity of each link of the network equipment reports its data packet sending status to the PDCP entity.

In one embodiment, the report may be performed inside one transceiving node. For example, in the mode shown in FIG. 4a, the RLC1 reports its data packet sending status to the PDCP1, the RLC2 reports its data packet sending status to the PDCP1. For another example, in the mode shown in FIG. 4b, the RLC3 reports its data packet sending status to the PDCP3.

In one embodiment, the report may be implemented through an Xn interface between different transceiving nodes, for example, in the mode shown in FIG. 4b, the RLC4 reports its data packet sending status to the PDCP3.

In one embodiment, the data packet sending status may include at least one of: the number of data packets buffered in the RLC entity, the number of data packets that have been sent by the RLC entity, the number of data packets that have been correctly received and acknowledged by the RLC entity, and sequence numbers of the data packets that have been correctly received and acknowledged by the RLC entity.

In step 202, the PDCP entity of the network equipment decides whether to deactivate or activate the data packet duplication function according to the data packet sending status reported by the RLC entity.

In step 203, the PDCP entity of the network equipment performs an operation of deactivating or activating the data packet duplication function correspondingly, and notifies the RLC entity in the same transceiving node to perform the operation of deactivating or activating the data packet duplication function correspondingly.

Figure 6:
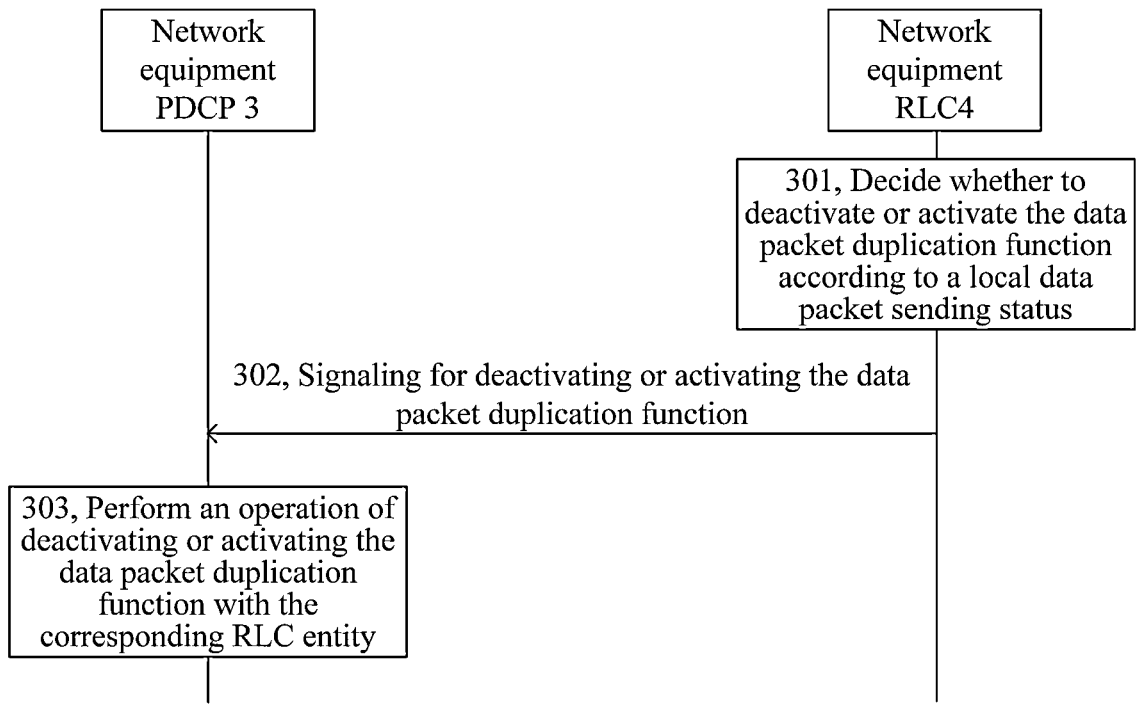
FIG. 6 is a flowchart illustrating that another transceiving node of a network equipment decides to deactivate or activate a data packet duplication function provided by an embodiment.

FIG. 6 is a flowchart illustrating that another transceiving node of the network equipment decides to deactivate or activate a data packet duplication function provided by an embodiment. As shown in FIG. 6, the implementation process includes steps 301 to 303 described below.

In step 301, a remote RLC entity located in another transceiving node of the network equipment decides whether to deactivate or activate the data packet duplication function according to a local data packet sending status. In the mode shown in FIG. 4b, this step is that the RLC4 decides whether to deactivate or activate the data packet duplication function according to the local data packet sending status.

In step 302: the remote RLC entity of the network equipment transmits the signaling message for deactivating or activating the data packet duplication function through the Xn interface. For example, in the mode shown in FIG. 4b, the RLC4 transmits the signaling message for deactivating or activating the data packet duplication function to the PDCP3 through the Xn interface, which is equivalent to transmit the signaling message for deactivating or activating the data packet duplication function through the Xn interface between two transceiving nodes.

In step 303, the PDCP entity of the network equipment performs an operation of deactivating or activating the data packet duplication function correspondingly, and notifies the RLC entity in the same transceiving node to perform the operation of deactivating or activating the data packet duplication function correspondingly. For example, in the mode shown in FIG. 4b, the PDCP3 notifies the RLC3 to perform the operation of deactivating or activating the data packet duplication function.

Figure 7:
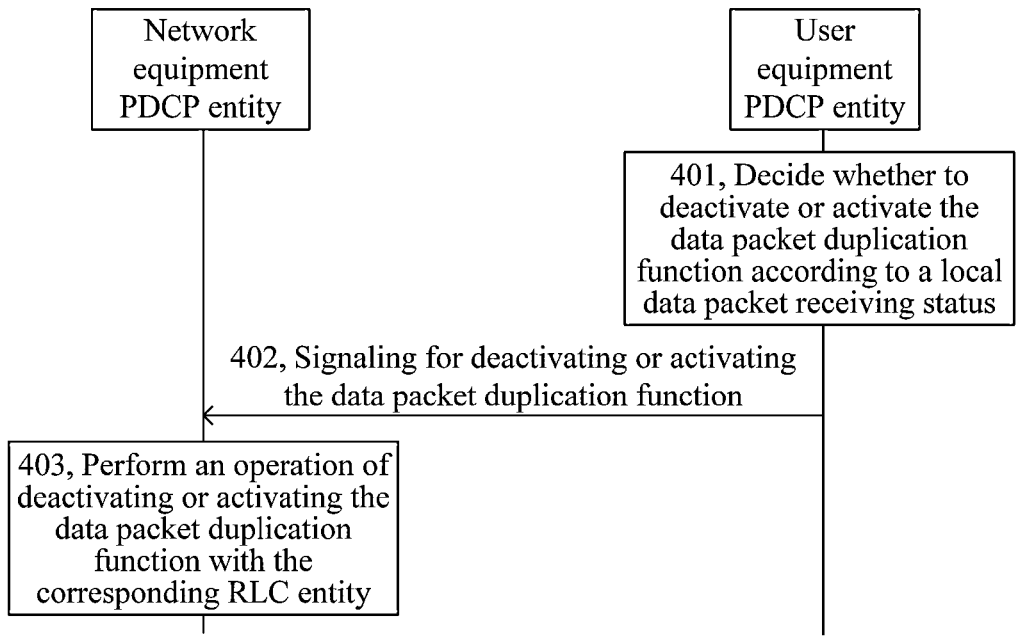
FIG. 7 is a flowchart illustrating that a user equipment decides to deactivate or activate a data packet duplication function provided by an embodiment.

FIG. 7 is a flowchart illustrating that a user equipment decides to deactivate or activate a data packet duplication function provided by an embodiment. As shown in FIG. 7, the implementation process includes steps 401 to 403 described below.

In step 401, the PDCP entity of the user equipment decides whether to deactivate or activate the data packet duplication function according to a local data packet receiving status.

In one embodiment, the local data packet receiving status may include at least one of:

The number of data packets correctly decoded in the RLC entity of each link, the number of data packets that have been received by the RLC entity of each link, and sequence numbers of data packets that have been correctly received and acknowledged by the RLC entity of each link.

In step 402: the PDCP entity of the user equipment sends the signaling message for deactivating or activating the data packet duplication function. The signaling message may be sent to the PDCP entity of the network equipment.

In one embodiment, the deactivating or activating signaling message may include at least one of:
  a signaling message of a RRC layer, a PDU for delivering a control message of a specific PDCP layer, a specific control element of a MAC layer, and a sub-header of MAC layer.

In an embodiment, the network equipment may predefine a primary link and a secondary link of the radio bearer. Each link is an end-to-end connection including a RLC entity. After receiving the signaling message for deactivating or activating the data packet duplication function, the network equipment starts to disable or enable the data packet duplication function. In the case of disabling the data packet duplication function, the network equipment stops sending the duplicated data packet to the RLC entity of the secondary link.

In one embodiment, the signaling message for deactivating or activating the data packet duplication function may include an identification of a link whose data packet duplication function needs to be deactivated or activated.

In one embodiment, the identification of the link may be a logic channel identification of the link.

In one embodiment, the user equipment may select one link to send the signaling message for deactivating or activating the data packet duplication function, and notify, through a logic channel used by actual transmission of the signaling message for deactivating or activating the data packet duplication function, the network equipment of a link whose data packet duplication function the user equipment expected to deactivate or activate.

In one embodiment, if the user equipment sends the signaling message for deactivating or activating the data packet duplication function in one link, it indicates that the user equipment expects to deactivate or activate the data packet duplication function of the other link.

In step 403, the PDCP entity of the network equipment performs an operation of deactivating or activating the data packet duplication function correspondingly according to the received signaling message, and notifies the RLC entity in the same transceiving node to perform the operation of deactivating or activating the data packet duplication function correspondingly.

Figure 8:
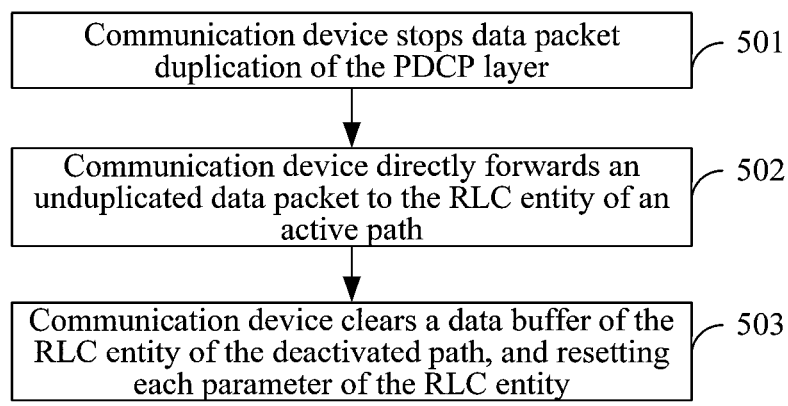
FIG. 8 is a flowchart of deactivating a data packet duplication function provided by an embodiment.

FIG. 8 is a flowchart of the operation of deactivating the data packet duplication function provided by the embodiment of the present disclosure. As shown in FIG. 8, the implementation process includes steps 501 and 503 described below.

In step 501: the communication device stops the data packet duplication in the PDCP layer.

In step 502: the communication device directly forwards an unduplicated data packet to the RLC entity of an active link.

In step 503: the communication device notifies the RLC entity of the deactivated link to clear a data buffer, and resets each parameter of the RLC entity.

The communication device in this embodiment may be the network equipment or the user equipment.

The active link here may include, but is not limited to, a link in an activated state. If the link is the active link, which may be understood as a link needing the data packet duplication function. The states of the active link and the deactivated link are different. The deactivate link may be understood as an inactive link, i.e. a link that does not need the data packet duplication function.

Figure 9:
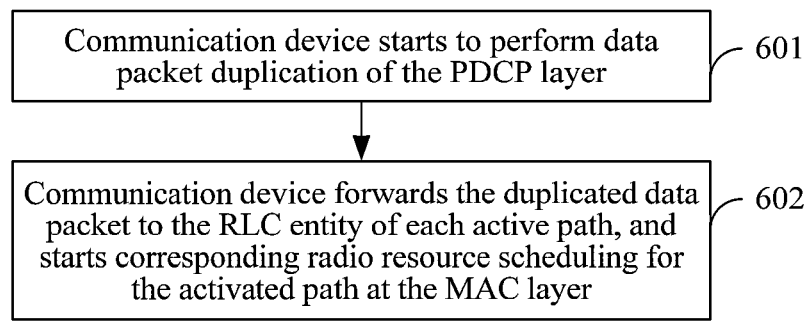
FIG. 9 is a flowchart of activating a data packet duplication function provided by an embodiment.

FIG. 9 is a flowchart of the operation of activating the data packet duplication function provided by the embodiment of the present disclosure. As shown in FIG. 9, the implementation process includes steps 601 and 602 described below.

In step 601: the communication device starts to perform data packet duplication of the PDCP layer.

In step 602: the communication device forwards the duplicated data packet to the RLC entity of each active link, and starts corresponding radio resource scheduling for the activated link in the MAC layer.

The communication device in this embodiment may be the network equipment or the user equipment.

Figure 10:
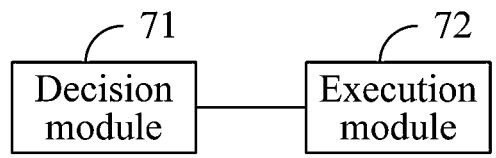
FIG. 10 is a schematic diagram of a control device for a data packet duplication function provided by an embodiment.

A control device for a data packet duplication function, as shown in FIG. 10, includes: a decision module 71, which is configured to decide to deactivate or activate a data packet duplication function; and an execution module 72, which is configured to perform an operation of deactivating or activating the data packet duplication function correspondingly.

In one embodiment, the control device may further include: a notification module, which is configured to notified a peer device of a radio bearer to deactivate or activate the data packet duplication function correspondingly after the decision module decides to deactivate or activate the data packet duplication function.

In one embodiment, a control device for the data packet duplication function is configured to be the network equipment, and the peer device of the radio bearer is the user equipment; or the control device of the data packet duplication function is configured to be the user equipment and the peer device of the radio bearer is the network equipment.

In one embodiment, the decision module determining to deactivate or activate the data packet duplication function includes any one or more of: determining, by the decision module, whether to start a process of deactivating or activating the data packet duplication function according to a local data packet sending status; preconfiguring, by the decision module, one or more events, in response to determining that the preconfigured event occurs, determining to start the process of deactivating or activating the data packet duplication function according to the event that occurs, and receiving, by the decision module, a signaling message for deactivating or activating the data packet duplication function.

In one embodiment, the step in which the execution module performs the operation of deactivating or activating the data packet duplication function correspondingly includes any one or more of:

The execution module selects one link to start to disable or enable the data packet duplication function. In a case of starting to disable the data packet duplication function, the execution module stops sending a duplicated data packet to a RLC entity to the selected link; or in a case of starting to enable the data packet duplication function, the execution module starts to send the duplicated data packet to the RLC entity of the selected link.

For a link specified in the signaling message for deactivating or activating the data packet duplication function, the execution module starts to disable or enable the data packet duplication function. In the case of starting to disable the data packet duplication function, the execution module stops sending the duplicated data packet to the RLC entity of the link specified in the signaling message for deactivating or activating the data packet duplication function; or in the case of starting to enable the data packet duplication function, the execution module starts to send the duplicated data packet to the RLC entity of the specified link For a secondary link, the execution module starts to disable or enable the data packet duplication function. In the case of starting to disable the data packet duplication function, the execution module stops sending the duplicated data packet to the RLC entity of the secondary link; or in the case of starting to enable the data packet duplication function, the execution module starts to send the duplicated data packet to the RLC entity of the secondary link.

In one embodiment, the step in which the execution module performs the operation of deactivating the data packet duplication function may include any one or more of:

The execution module disables the data packet duplication function, stops sending a duplicated data packet to an RLC entity in a deactivated link.

The execution module empties a buffer of the RLC entity in the deactivated link.

The execution module resets a parameter of the RLC entity in the deactivated link.

In one embodiment, the step in which the execution module performs the operation of activating the data packet duplication function may include any one or more of:

The execution module enables the data packet duplication function, starts to send a duplicated data packet to an RLC entity in an activated link.

The execution module enables or restores a processing function of the RLC entity in the activated link.

The execution module enables a radio resource scheduling corresponding to the activated link in an MAC layer.

Other implementation details may be seen in the above embodiments.

The modules described above may also be stored in a computer-readable storage medium if implemented in the form of software function modules and sold or used as independent products. Based on this understanding, solutions provided by embodiments of the present disclosure substantially, or the part contributing to the related art, may be embodied in the form of a software product. The software product is stored on a storage medium and includes several instructions for enabling a computer device (which may be a personal computer, a server or a network device) to execute all or part of the methods provided by embodiments of the present disclosure. The foregoing storage medium may be a U disk, a mobile hard disk, a read only memory (ROM), a random access memory (RAM), a magnetic disk, an optical disk or another medium that can store program codes. In this way, the embodiment of the present disclosure is not limited to any particular combination of hardware and software.

A communication device includes a processor and memory.

The memory is configured to store executable instructions.

The processor is configured to execute the executable instructions to perform the following operations: determining to deactivate or activate a data packet duplication function; and performing an operation of deactivating or activating the data packet duplication function correspondingly.

In one embodiment, the processor, when executing the programs, further executes the following operation: after the data packet duplication function is deactivated or activated, notifying a peer device of a radio bearer to deactivate or activate the data packet duplication function correspondingly.

In one embodiment, the communication device is a network equipment, and the peer device of the radio bearer is a user equipment; or the communication device is the user equipment and the peer device of the radio bearer is the network equipment.

In one embodiment, determining to deactivate or activate the data packet duplication function includes any one or more of:
  determining whether to start a process of deactivating or activating the data packet duplication function according to a local data packet sending status;
  preconfiguring one or more events, in response to determining that the preconfigured event occurs, determining to start the process of deactivating or activating the data packet duplication function according to the event that occurs;
  receiving a signaling message for deactivating or activating the data packet duplication function.

In one embodiment, performing the operation of deactivating or activating the data packet duplication function correspondingly includes any one or more of:
  selecting one link to start to disable or enable the data packet duplication function, in a case of starting to disable the data packet duplication function, stopping sending a duplicated data packet to a RLC entity to the selected link; or in a case of start to enable the data packet duplication function, start to send the duplicated data packet to the RLC entity of the selected link;
  for a link specified in the signaling message for deactivating or activating the data packet duplication function, starting to disable or enable the data packet duplication function, in the case of starting to disable the data packet duplication function, stopping sending the duplicated data packet to the RLC entity of the link specified in the signaling message for deactivating or activating the data packet duplication function; or in the case of starting to enable the data packet duplication function, starting to send the duplicated data packet to the RLC entity of the specified link;

for a secondary link, starting to disable or enable the data packet duplication function, in the case of starting to disable the data packet duplication function, stopping to send the duplicated data packet to the RLC entity of the secondary link; or in the case of starting to enable the data packet duplication function, starting to send the duplicated data packet to the RLC entity of the secondary link.

In one embodiment, performing the operation of deactivating the data packet duplication function may include any one or more of: disabling the data packet duplication function, stopping sending a duplicated data packet to a RLC entity in a deactivated link; clearing a buffer of the RLC entity in the deactivated link; and resetting a parameter of the RLC entity in the deactivated link.

In one embodiment, performing the operation of activating the data packet duplication function may include any one or more of: enabling, by an execution module, the data packet duplication function, starting to send a duplicated data packet to an RLC entity in an activated link; enabling or restoring a processing function of the RLC entity in the activated link; and enabling a radio resource scheduling corresponding to the activated link in an MAC layer.

Other implementation details may be seen in the above embodiments.

In some embodiments, the communication device may further include: a communication interface, such as a transceiver antenna or the like, which may be used for information interaction between communication devices.

Various combinations of the optional embodiments are within the protection scope of the present disclosure.

Correspondingly, the embodiment of the present disclosure further provides a computer storage medium storing program codes such as computer programs, which after being configured to be executed by a processor, execute one of more of data packet duplication functions provided by the embodiment of the present disclosure.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

What is claimed is:

1. A method for wireless communication, comprising:
   determining, by a communication device, a characteristic associated with the communication device based on preconfiguring information received by the communication device,
   wherein the characteristic comprises one or more events,
   wherein the one or more events comprise a second event related to a signal-to-noise ratio being less than or equal to a second predetermined threshold; and
   initiating, by the communication device, an activation or deactivation of a data packet duplication function based on the characteristic,
   wherein the data packet duplication function is deactivated upon an occurrence of the second event.

2. The method of claim 1, wherein the one or more events comprise a first event related to a signal-to-noise ratio being greater than or equal to a first predetermined threshold,
   wherein the data packet duplication function is activated upon an occurrence of the first event.

3. The method of claim 1, wherein the characteristic comprises a traffic type of a data packet transmitted by the communication device.

4. The method of claim 3, wherein the traffic type comprises at least a Ultra-Reliable and Low Latency Communication (URLLC) type.

5. The method of claim 1, wherein the characteristic comprises an operation mode of the communication device.

6. The method of claim 5, wherein the data packet duplication function is activated upon determining that the operation mode of the communication device is a carrier aggregation (CA) mode and/or a dual connectivity (DC) mode.

7. The method of claim 1, wherein the characteristic comprises a Quality of Service (QOS) parameter configured for a communication of the communication device.

8. The method of claim 1, wherein upon the activation of the data packet duplication function, data packets are duplicated according to a predetermined rule that comprises at least one of:
   duplicating the data packets sequentially, one data packet by one data packet,
   duplicating one data packet once every predetermined number of data packets, or
   duplicating the data packets according to a data packet type.

9. A device for wireless communication, comprising: at least one processor that is configured to:
   determine a characteristic associated with the device based on preconfiguring information received by the communication device,
   wherein the characteristic comprises one or more events,
   wherein the one or more events comprise a second event related to a signal-to-noise ratio being less than or equal to a second predetermined threshold; and
   initiate an activation or deactivation of a data packet duplication function based on the characteristic,
   wherein the data packet duplication function is deactivated upon an occurrence of the second event.

10. The device of claim 9, wherein the one or more events comprise a first event related to a signal-to-noise ratio being greater than or equal to a first predetermined threshold,
    wherein the at least one processor is configured to activate the data packet duplication function upon an occurrence of the first event.

11. The device of claim 9, wherein the characteristic comprises a traffic type of a data packet transmitted by the device.

12. The device of claim 11, wherein the traffic type comprises at least a Ultra-Reliable and Low Latency Communication (URLLC) type.

13. The device of claim 9, wherein the characteristic comprises an operation mode of the device.

14. The device of claim 13, wherein the at least one processor is configured to activate the data packet duplication function upon determining that the operation mode of the device is a carrier aggregation (CA) mode and/or a dual connectivity (DC) mode.

16. The device of claim 9, wherein the characteristic comprises a Quality of Service (QOS) parameter configured for a communication of the device.

16. The device of claim 9, wherein upon the activation of the data packet duplication function, data packets are duplicated according to a predetermined rule that comprises at least one of:
- duplicating the data packets sequentially, one data packet by one data packet,
- duplicating one data packet once every predetermined number of data packets, or
- duplicating the data packets according to a data packet type.

* * * * *